UNITED STATES PATENT OFFICE.

JOSEPH G. FULLER, OF BROOKLYN, NEW YORK, ASSIGNOR TO STEPHEN HALSTEAD, JR., OF SAME PLACE.

COMPOSITION FOR PAINTING THE BOTTOMS OF VESSELS, &c.

Specification forming part of Letters Patent No. 27,331, dated February 28, 1860.

*To all whom it may concern:*

Be it known that I, JOSEPH GONZOLVE FULLER, of Brooklyn, in the county of Kings and State of New York, have invented, made, and applied to use a certain new and useful improvement in paint composition for coating vessel-bottoms, piles, dry-docks, and other articles exposed to the action of water; and I do hereby declare that the following is a full, clear, and exact description of the nature of said material and the manner of compounding the same.

I make use of sulphur or brimstone combined with india-rubber, turpentine, and linseed-oil, and mix the same together in the following manner: To one pound of india-rubber I apply about one gallon of pure spirits of turpentine and allow the same to thoroughly dissolve. I then take about twenty pounds of rectified brimstone and mix therewith the aforesaid rubber paste, together with about one gallon of linseed-oil and one gallon of gas-tar. I also add one pound of powdered verdigris and one pound of burned blue vitriol. I permit this compound to remain for about twelve hours, that the various ingredients may become thoroughly mixed or infused, and then add two gallons of linseed-oil. The burned blue vitriol is added to increase the drying qualities, and the verdigris combines with any acids contained in the compound. The india-rubber combines with the sulphur and tar, making a perfect compound, and also acting to hold the various ingredients more firmly together and prevent the decomposition that has heretofore taken place where tar and brimstone only were used.

My compound, formed in the manner before set forth, makes a superior paint or coating for the bottoms of vessels, for piles and dry-docks, and is of a penetrating nature, adhering strongly to the wood, or to a previously-painted surface. It makes a smooth bottom for sailing and other vessels, and to this compound no barnacles can attach themselves, and worms will not penetrate said coating. The surface becomes harder, and this paint will last much longer than any other materials with which I am acquainted.

Having thus described my said invention, what I claim, and desire to secure by Letters Patent, is—

The compound of brimstone, tar, rubber, verdigris, and oil, substantially in the proportions and for the purposes specified.

In witness whereof I have hereunto set my signature this 24th day of January, 1860.

JOSEPH G. FULLER.

Witnesses:
LEMUEL W. SERRELL,
CHAS. H. SMITH.